J. WERNER.
CANDY MOLDING MACHINE.
APPLICATION FILED NOV. 7, 1906.

959,664.

Patented May 31, 1910.
13 SHEETS—SHEET 1.

FIG. 1.

WITNESSES:
Clarence W. Carroll
L. Thon.

INVENTOR:
John Werner
by Osgood & Davis
his Attys

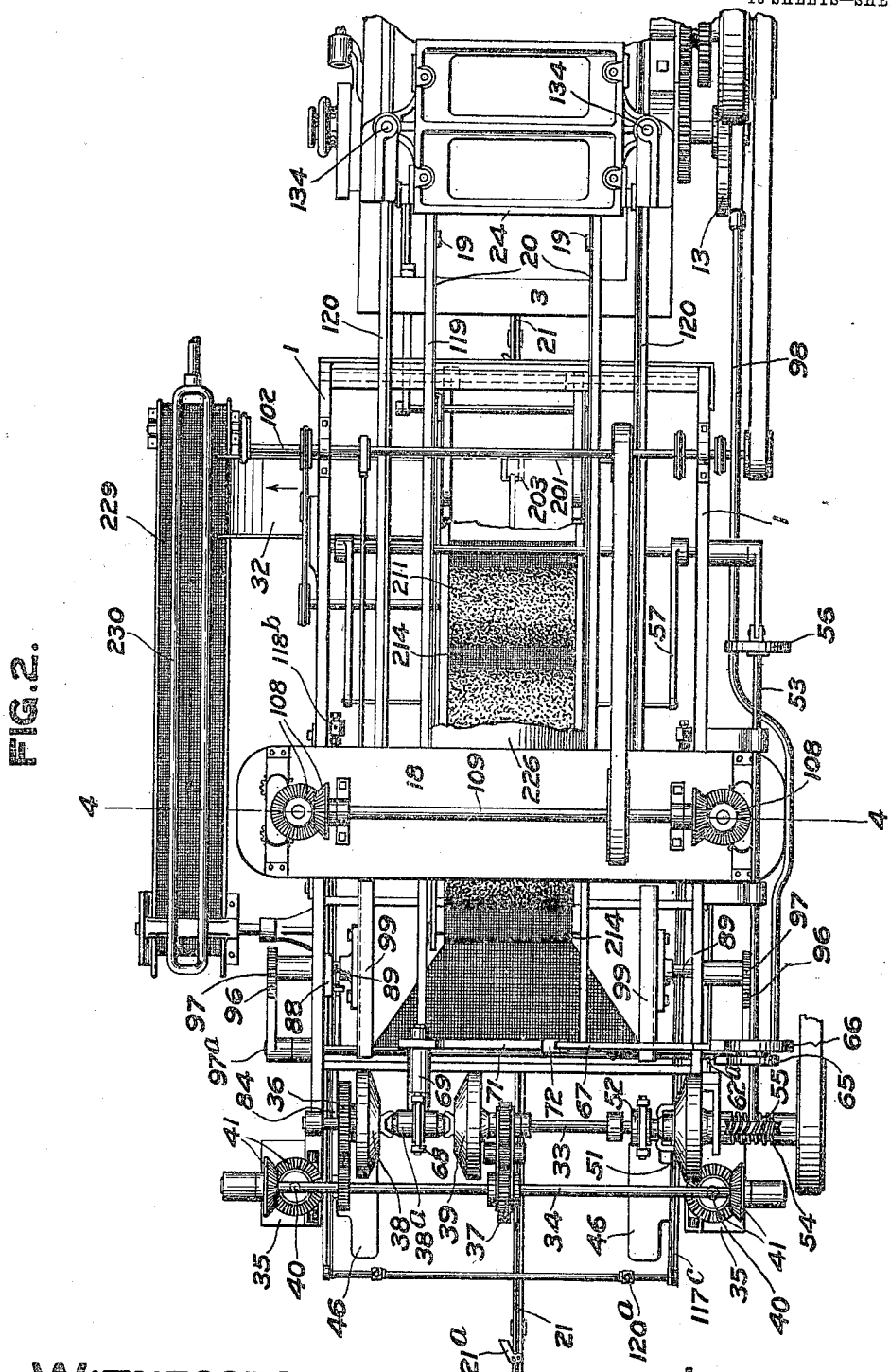

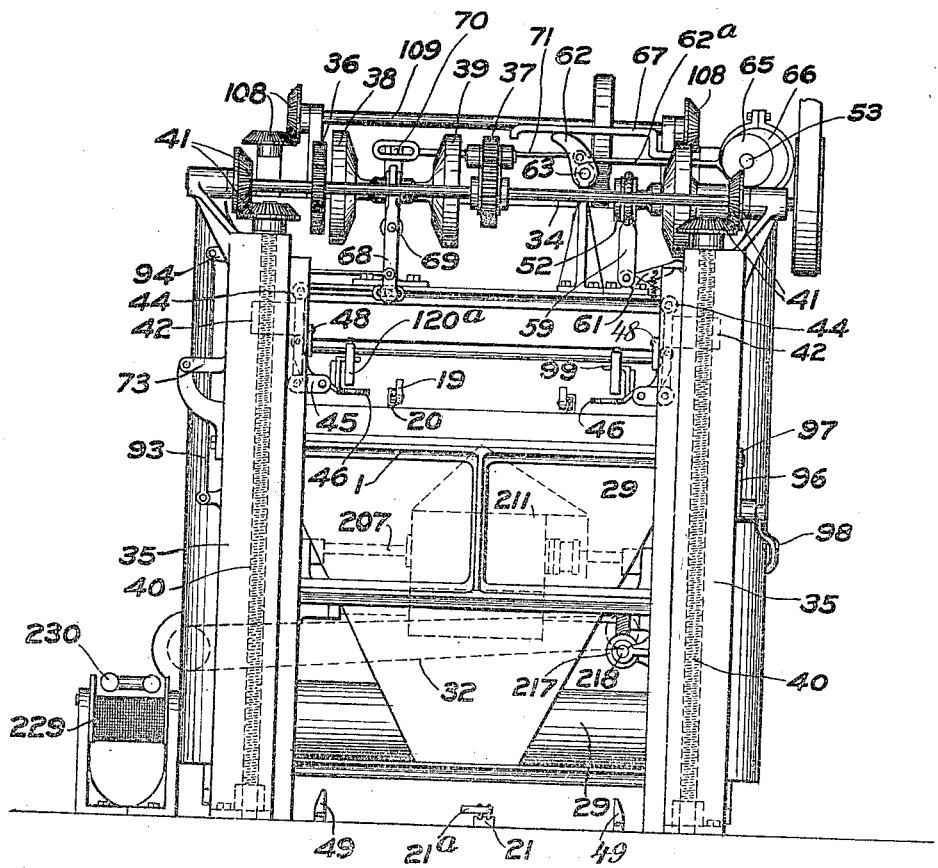
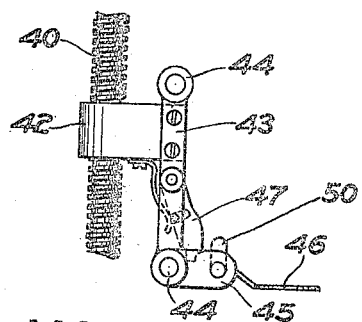
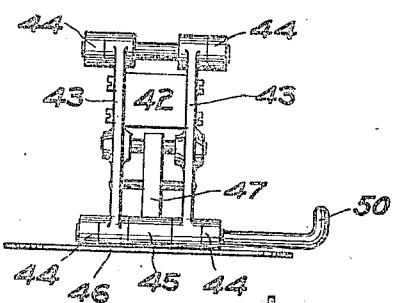

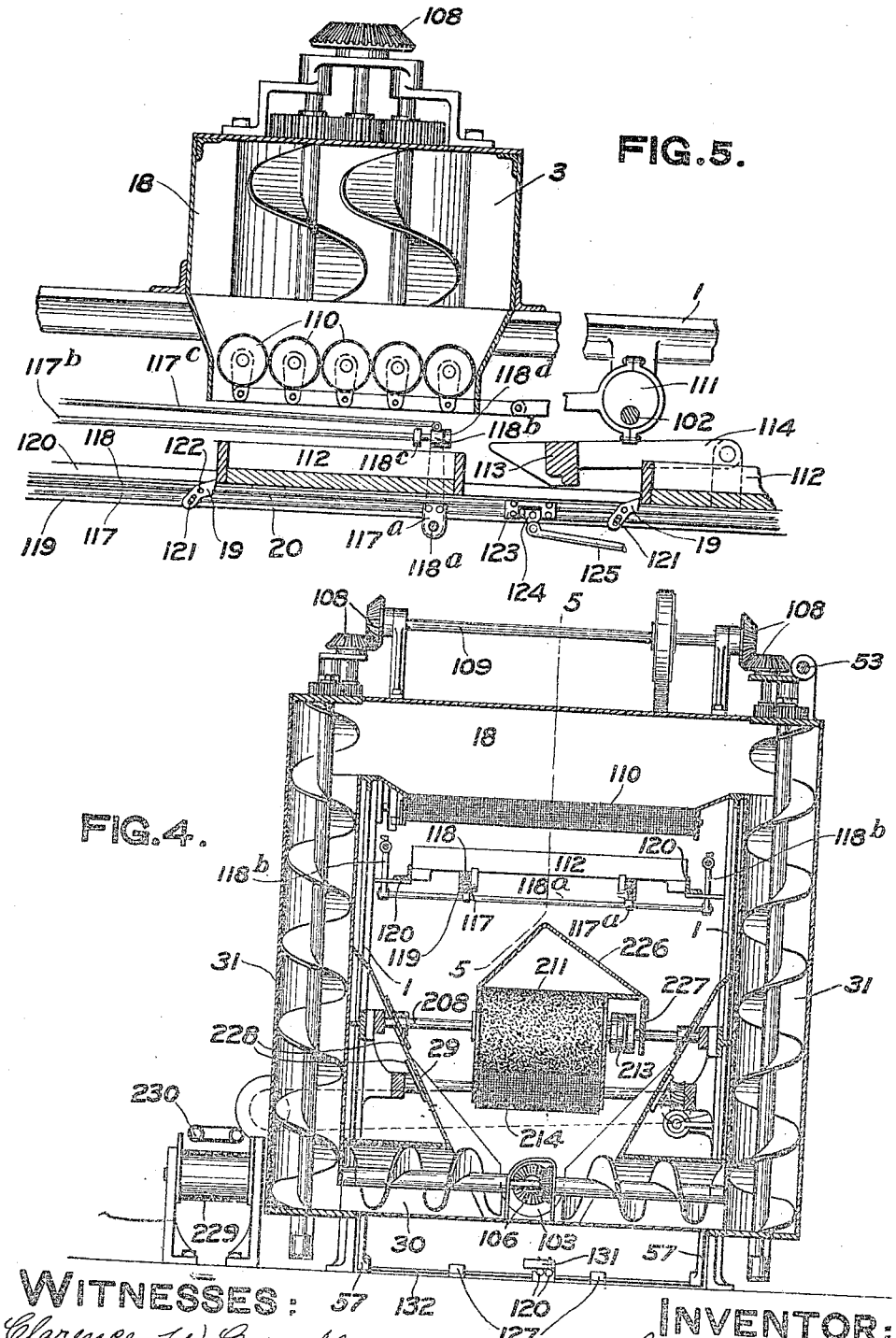

J. WERNER.
CANDY MOLDING MACHINE.
APPLICATION FILED NOV. 7, 1906.
959,664.
Patented May 31, 1910.
13 SHEETS—SHEET 5.
FIG. 8.
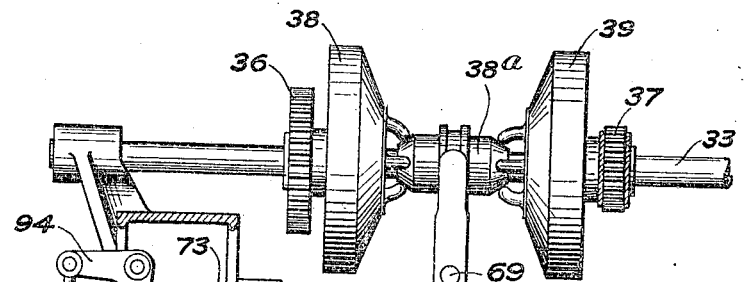
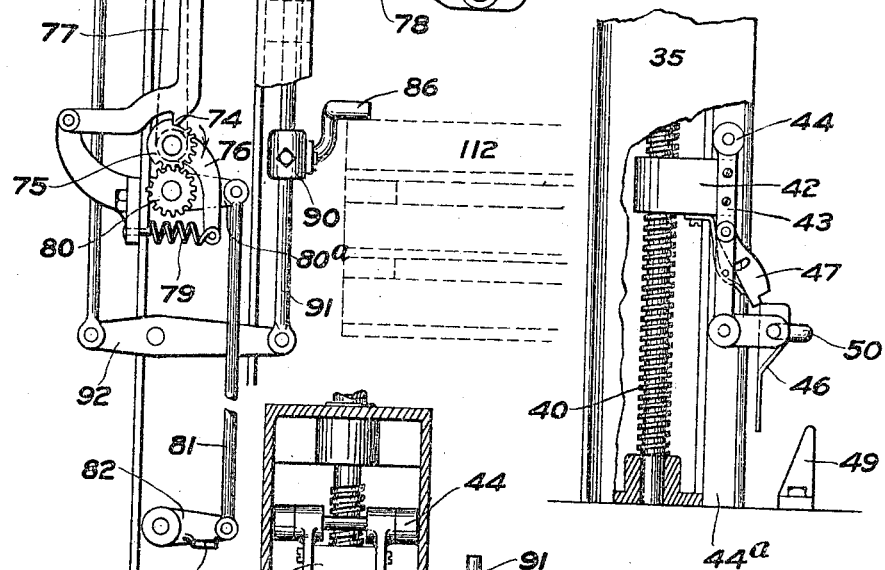
FIG. 9.
FIG. 10.
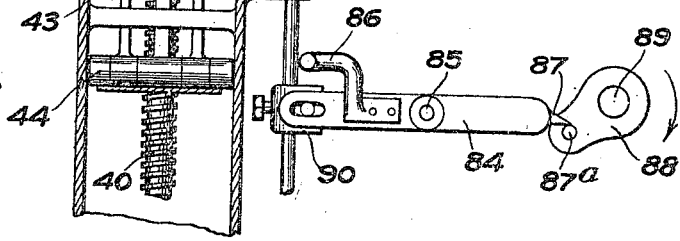
WITNESSES:
Clarence W. Carroll
L. Thon
INVENTOR:
John Werner
by Osgood & Davis
his Attys

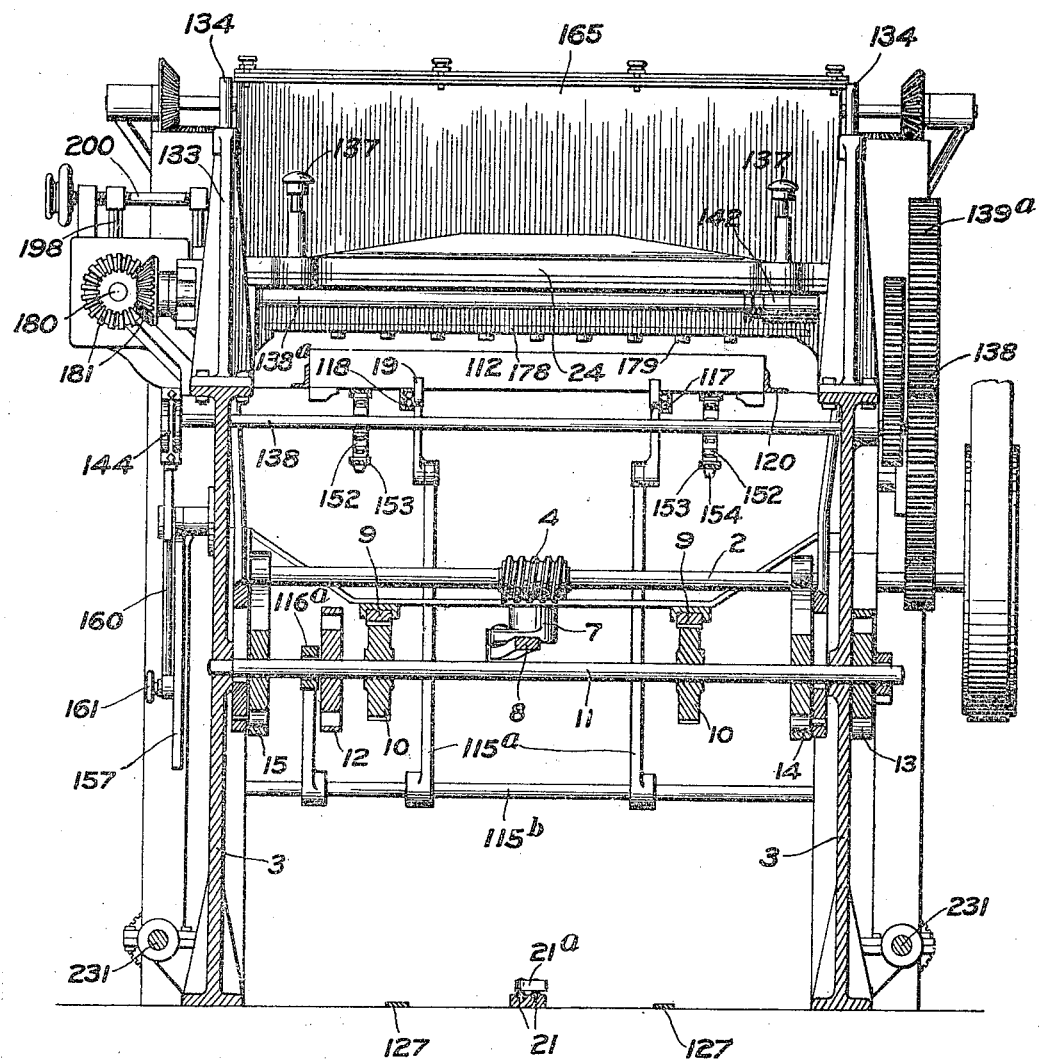

J. WERNER.
CANDY MOLDING MACHINE.
APPLICATION FILED NOV. 7, 1906.
959,664.
Patented May 31, 1910.
13 SHEETS—SHEET 11.
FIG. 19.
FIG. 21. FIG. 22.
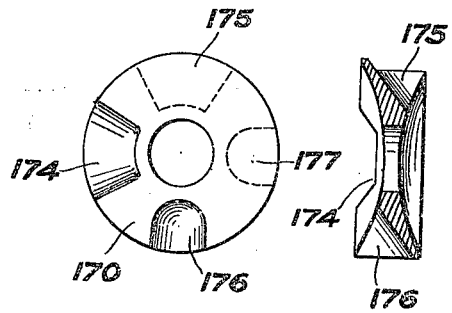
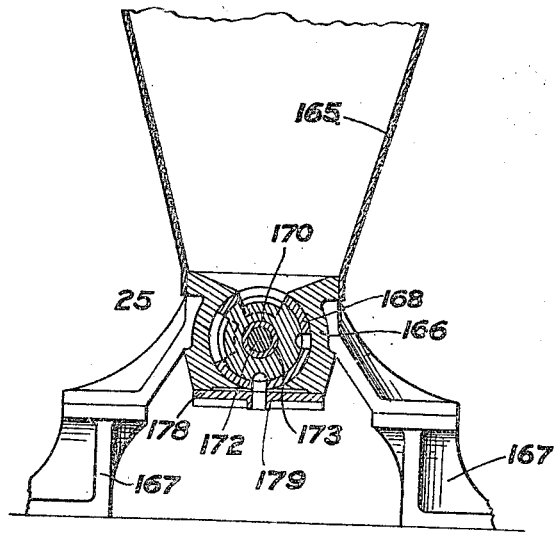
FIG. 23.
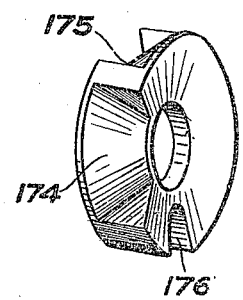
FIG. 20.
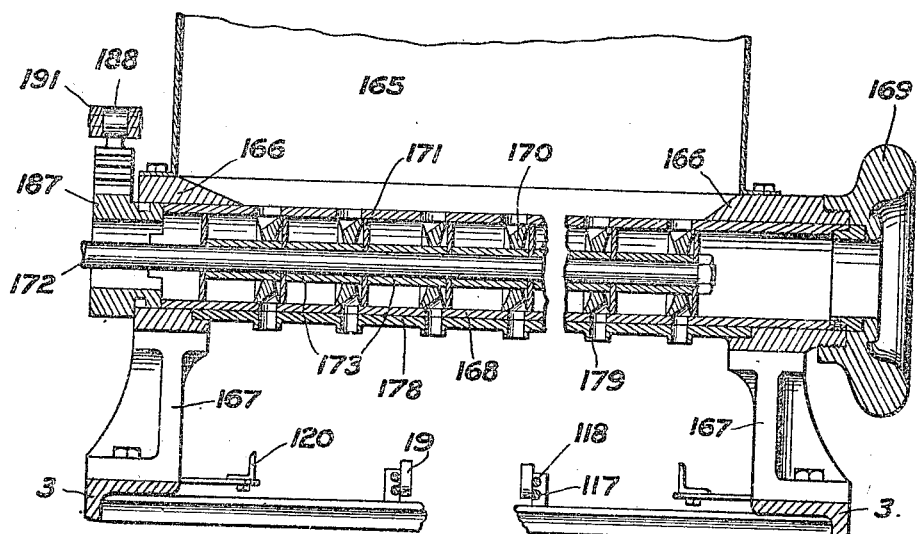
WITNESSES:
Clarence W. Carroll
L. Thon
INVENTOR:
John Werner
by Osgood & Davis
his Attys

J. WERNER.
CANDY MOLDING MACHINE.
APPLICATION FILED NOV. 7, 1906.

959,664.

Patented May 31, 1910.
13 SHEETS—SHEET 12.

WITNESSES:
Clarence W. Carroll
L. Thon.

INVENTOR:
John Werner
by Offield & Davis
his Attys

J. WERNER.
CANDY MOLDING MACHINE.
APPLICATION FILED NOV. 7, 1906.
959,664.
Patented May 31, 1910.
13 SHEETS—SHEET 13.
FIG. 27.
FIG. 28.
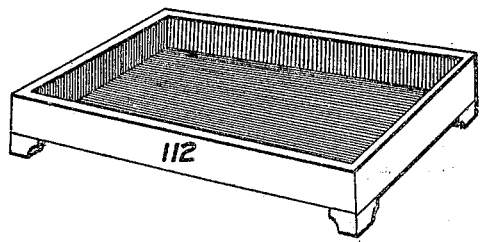
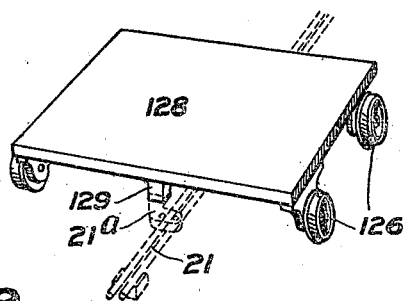
FIG. 29.
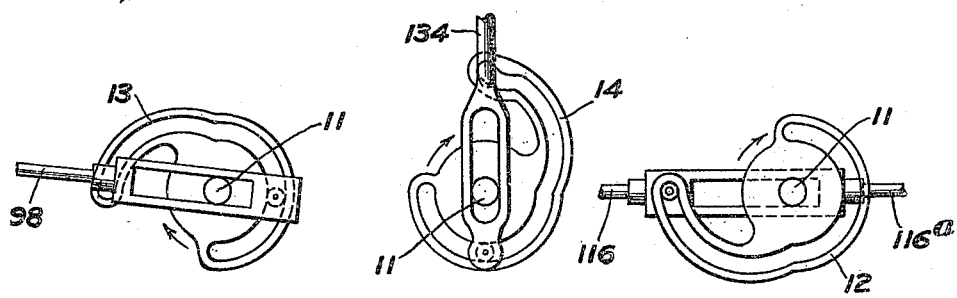
FIG. 30.
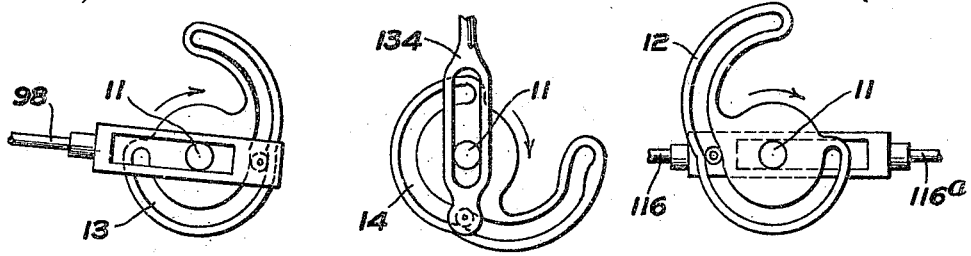
FIG. 31.
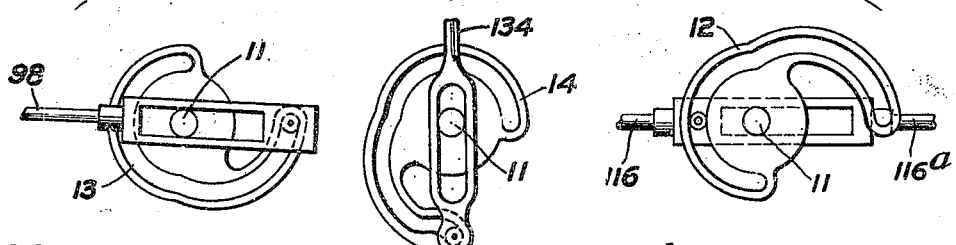
WITNESSES:
Clarence W. Carroll
L. Thorn
INVENTOR:
John Werner

UNITED STATES PATENT OFFICE.

JOHN WERNER, OF ROCHESTER, NEW YORK.

CANDY-MOLDING MACHINE.

959,664.     Specification of Letters Patent.     Patented May 31, 1910.

Application filed November 7, 1906. Serial No. 342,375.

*To all whom it may concern:*

Be it known that I, JOHN WERNER, a citizen of the United States, and resident of Rochester, in the county of Monroe and State of New York, have invented certain new and useful Improvements in Candy-Molding Machines, of which the following is a specification.

This invention relates to candy molding machines, consisting of several coöperating machines, including a starch machine, and a candy or dropping machine.

The object is to produce a machine adapted to perform automatically all the needful operations, except during the setting of the candy.

Figure 14:
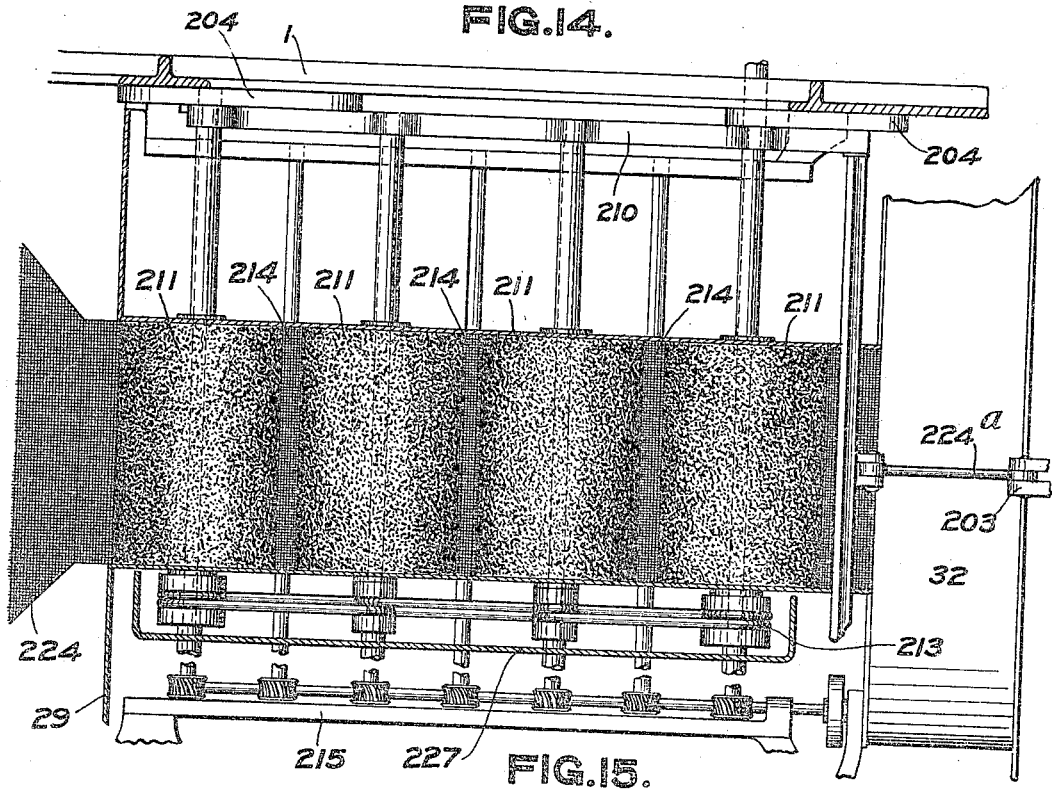
Figure 15:
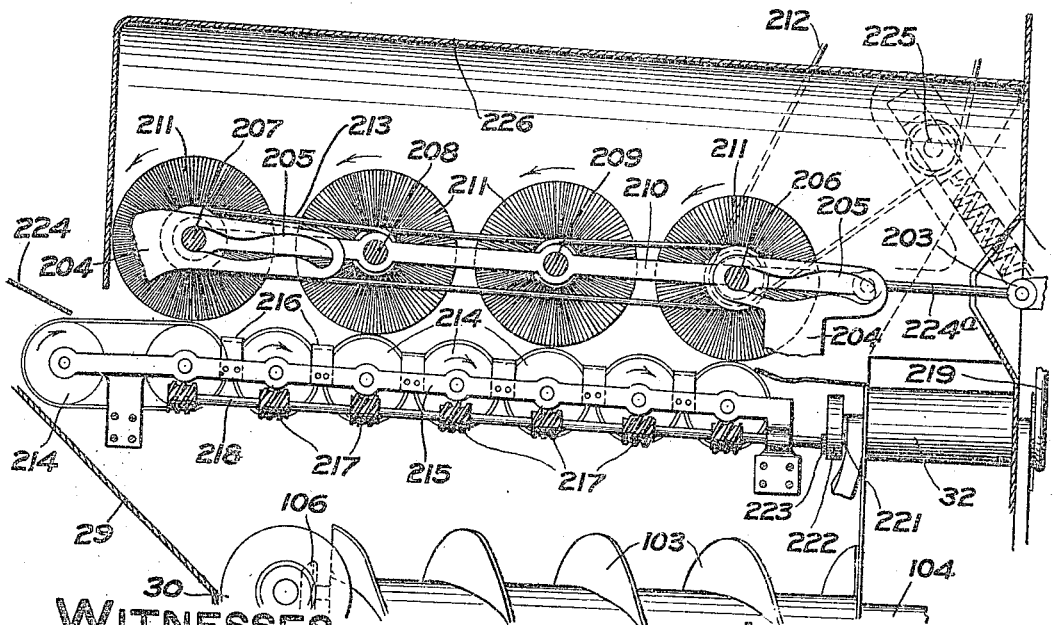
Figure 16:
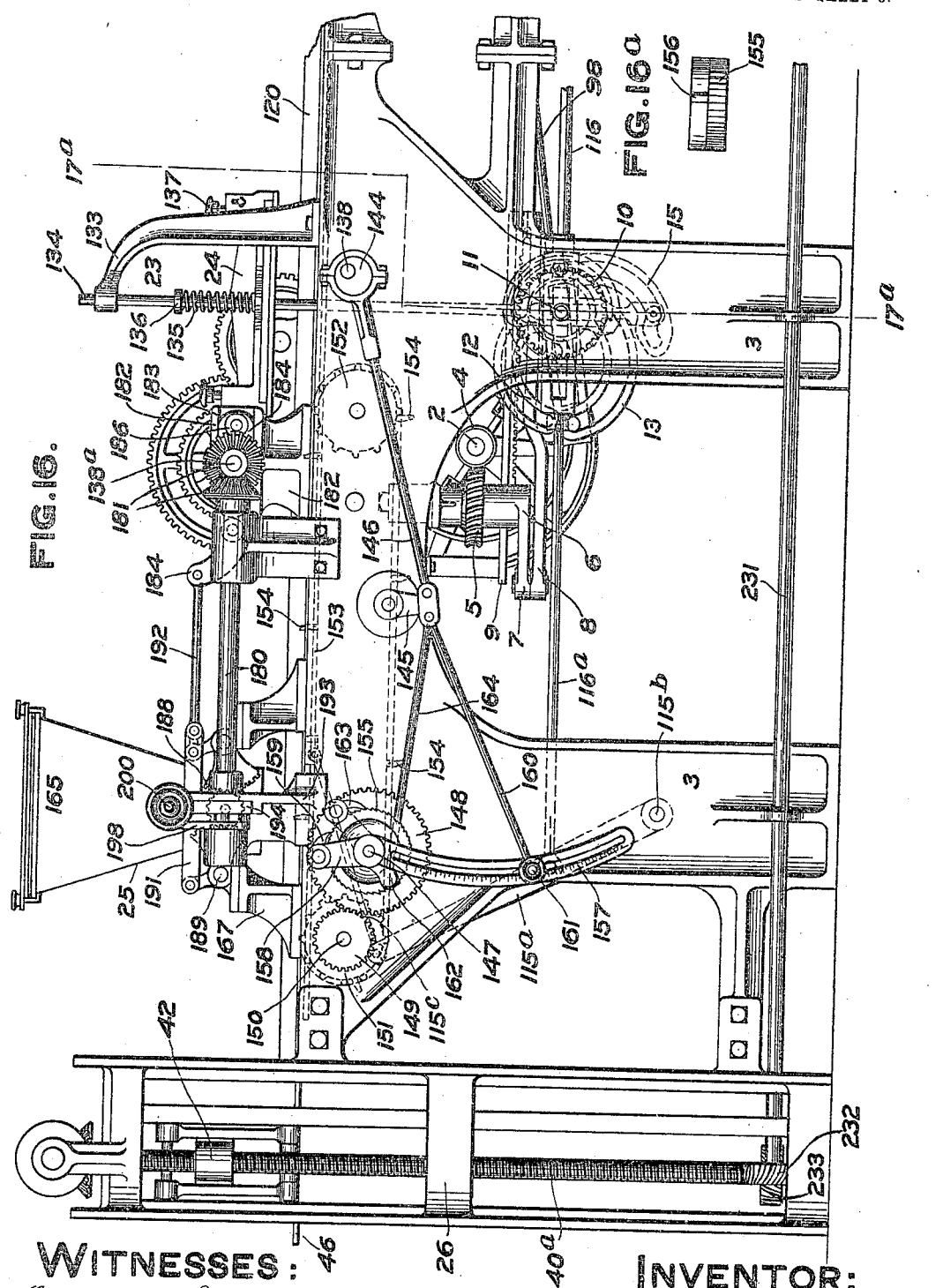
Figure 17:
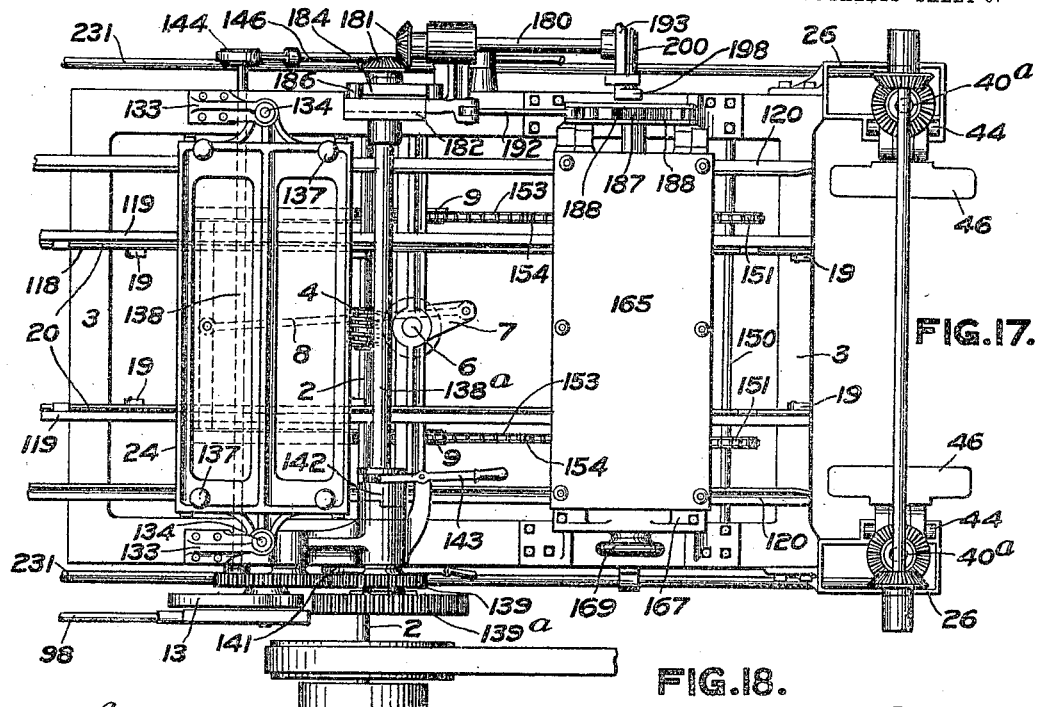
Figure 18:
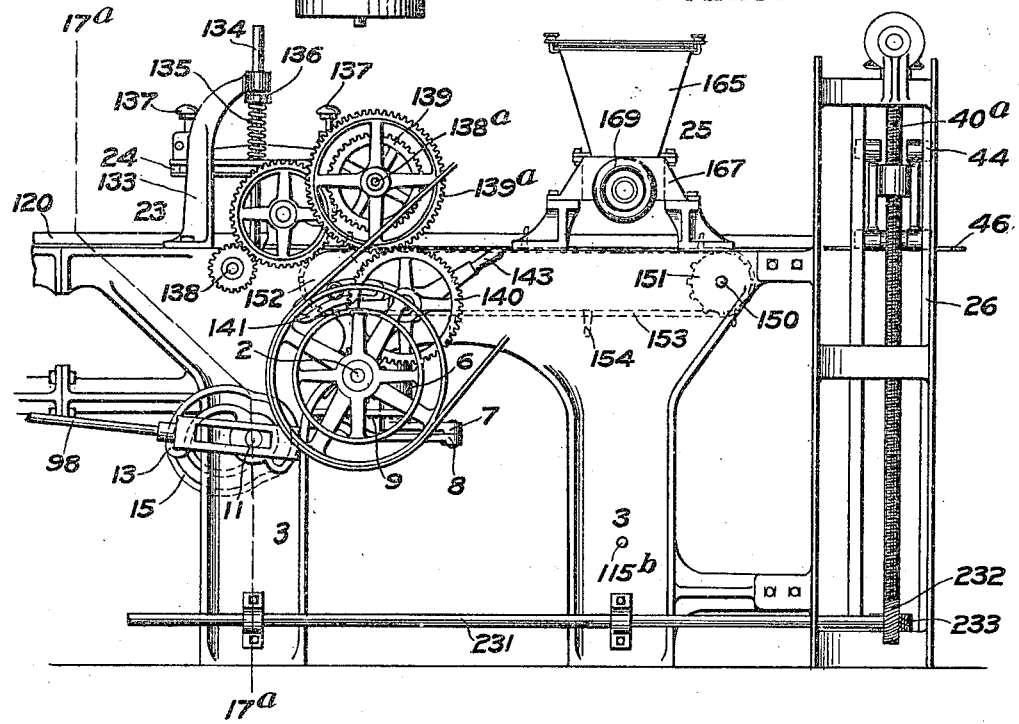
Figure 24:
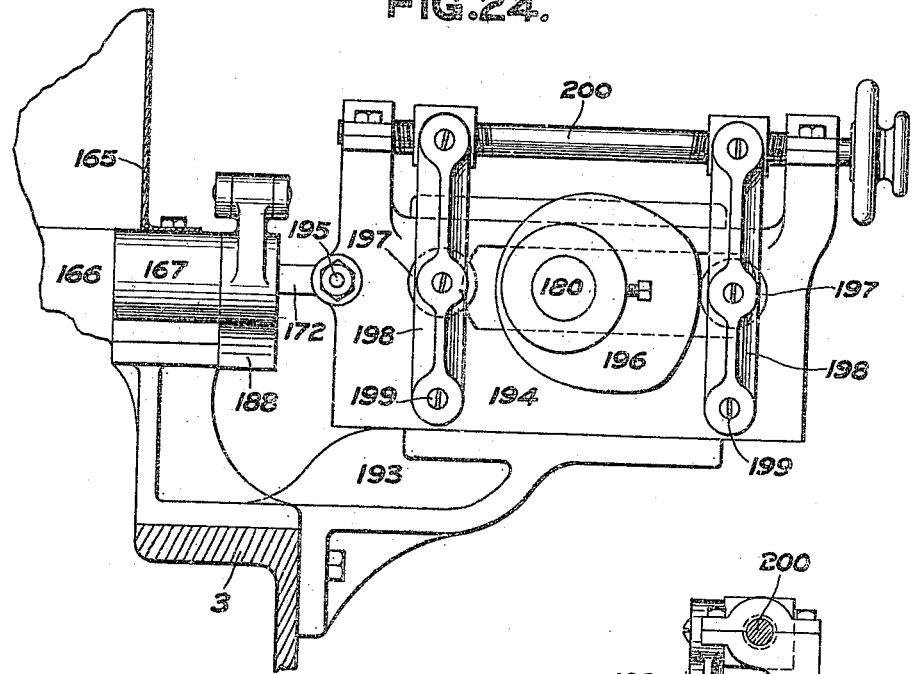
Figure 25:
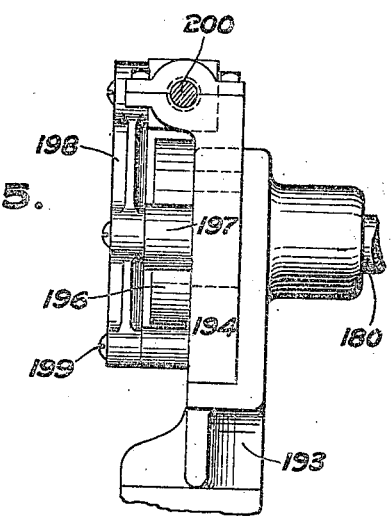
Figure 26:
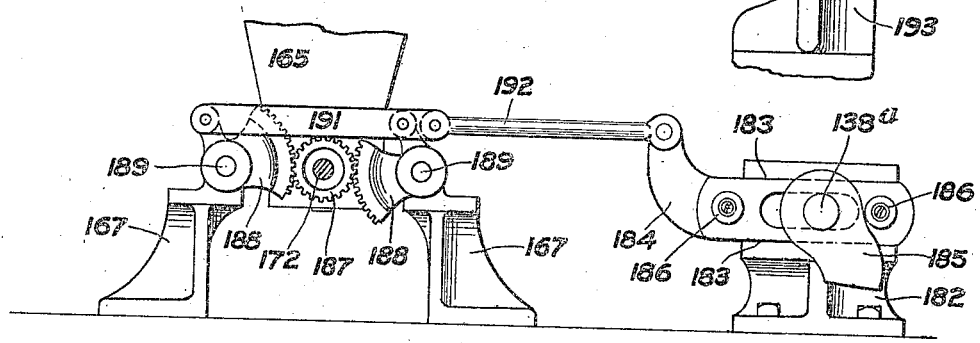

In the drawings:—Figure 1 is a side elevation of the starch machine; Fig. 2 is a plan view of the starch machine; Fig. 3 is an end view of the starch machine; Fig. 4 is a section of the starch machine on the line 4—4 of Fig. 1; Fig. 5 is a section of the starch hopper on the line 5—5 of Fig. 4; Figs. 6 to 13 are views of details of the elevator mechanism; Fig. 14 is a plan view of the cleaner; Fig. 15 is an elevation of the cleaner; Fig. 16 is a left hand elevation of the dropping machine; Fig. 16$^a$ is a plan view of a detail; Fig. 17 is a plan view of the dropping machine; Fig. 17$^a$ is a cross-section on the line 17$^a$—17$^a$ of Fig. 18; Fig. 18 is a right hand elevation of the dropping machine; Fig. 19 is a cross-section of the dropping mechanism; Fig. 20 is a longitudinal section of the dropping mechanism; Figs. 21 to 23 are details of the dropping cutters; Fig. 24 is a rear elevation of the plunger mechanism; Fig. 25 is a left side view of the plunger mechanism; Fig. 26 is a left side view of the dropper rocking mechanism; Fig. 27 is a perspective view of a starch tray; Fig. 28 is a perspective view of a carrier; Fig. 29 shows, singly, the operating-cams in normal position; Fig. 30 shows the operating-cams at half stroke; and Fig. 31 shows the operating-cams at full stroke.

The "starch" machine is here described first, and afterward the "dropping" machine, or candy molder.

The skeleton framework 1 of the starch machine forms a support for the various mechanisms requisite to separating candy from the starch in which it has been cast.

A driven shaft 2, supported by bearings on the frame 3 of the dropping machine (see Figs. 1 and 16), carries a worm 4 (see Fig. 16) meshing with a worm gear 5 fastened upon a vertical shaft 6, carrying at its lower end a crank-arm 7. A link 8 connects the crank-arm 7 with a horizontal rack 9, engaging a spur gear 10 on a shaft 11. The shaft 11 will hereinafter be called the cam shaft, as it carries operating cams 12, 13, 14 and 15, Fig. 17$^a$. The motion of the rack 9 turns the said cams through approximately 180 degrees.

A series of carriers 128, each carrying several trays, 112, filled with starch and molded candy, are brought one by one, into the elevating mechanism 16 at the end of the starch machine (Fig. 1). The pile of trays is lifted slowly from a carrier, and the trays are pulled from the pile one at a time into a tumbler 17, Fig. 1. The tumbler reverses the tray and drops the candy and starch contained in the tray into a hopper 17$^a$ below, and the emptied tray is returned to position and is passed on under the starch-box 18, and filled with fresh starch.

Pawls 19 on a reciprocating track 20 keep the trays moving in succession through the machine, while a similar track 21 on the floor provided with pawls 21$^a$ advances the carriers 128 underneath the machine.

When a tray passes from under the starch hopper 18, a scraper 22 (Fig. 1) levels the starch to the top of the tray. In the next step, the tray stops for a moment in the molding-press 23, and the mold 24 comes down and impresses in the starch the desired forms in which candy is to be cast.

A hopper 25, full of molten syrup, is located so that the trays may stop in succession under it as they are moved along by the reciprocating track, and receive a charge of syrup through a suitably timed dropping mechanism under the hopper. After passing the dropper, the trays are fed into an elevator 26 (Fig. 16) at the end of the machine, which descends slowly and deposits a pile of trays upon a carrier 128 which has been brought on the track 21 into correct position to receive them. They are then set aside until the candy cools, when they are ready to be put through the machine as has just been described. When the tumbler 17 turns over, the mixed candies and starch fall upon a sloping plate or screen, and pass between rotating brushes 27, and screen rollers 28, which constitute the "cleaner." The loose starch falls through the screen rollers into a hopper 29, and horizontal and vertical screw conveyers 30 and 31 return it to the starch hopper 18 (see Figs. 4 and 5). The candies, being too large to fall through the rolls, are pushed along by the set 27 of brushes, and fall upon a transverse belt 32 which carries them to the outside of the machine to a suitable receptacle.

A driven shaft 33 (Fig. 2) and a shaft 34 parallel thereto, are supported in bearings on the elevator-frame 35. Spur gears 36 and 37 (see Fig. 2) attached to friction clutches 38 and 39, on the driven shaft, are arranged to rotate the shaft 34 in one direction or the other, according as one or the other of said friction clutches is engaged. Vertical screw threaded spindles 40 are driven by bevel gears 41 on the ends of the shaft 34, in direct relation to the movement of said shaft.

On each of the spindles 40 is an elevator casting 42 (see Figs. 6 and 7). These have side members 43, carrying rollers 44 adapted to guide the elevator in slots in the frame 35. The lower ends of the side pieces 43 have pivoted between them a casting 45, and to this is attached the tray-supporting plate 46. A spring dog 47 prevents the plate 46 from swinging downward, so that the trays are lifted as the elevator travels up the spindles 40. When the last tray has been taken into the machine, the dog 47 is tripped by a projection 48 (see Fig. 3), allowing the plate 46 to tilt to a vertical position. The elevator is then reversed, and when it reaches the bottom of its travel, a post 49 on the floor engages a projection 50 on the pivot of the casting 45, and swings the plate 46 into a horizontal position again, the dog 47 snapping back into place.

The elevator reversing and automatic controlling mechanism is best shown in Figs. 8 to 13.

When the elevator reaches the limit of travel in its upward movement, a roller 44 on the left hand elevator strikes a pivoted trigger or trip 73 (see Fig. 8). A projection 74 of this bar takes into a notch in a spur gear 75, which has a spring actuated arm 76 on one end, and a longer (vertical) arm 77 on the other end of its shaft, connected, through a link 78, with the clutch-operating-lever 68. The arm 76 is pulled by a spring 79, fastened to said arm and to the frame, so as to turn the gear 75 in the direction of the arrow as soon as the trigger 73 releases the gear, and thus the arm 77 shifts the clutch parts, disconnects the "up" clutch 39, and sets the "down" clutch 38. It will be seen that the "down" clutch 38 will be set in operation by the release of this trigger or trip.

Figure 11:
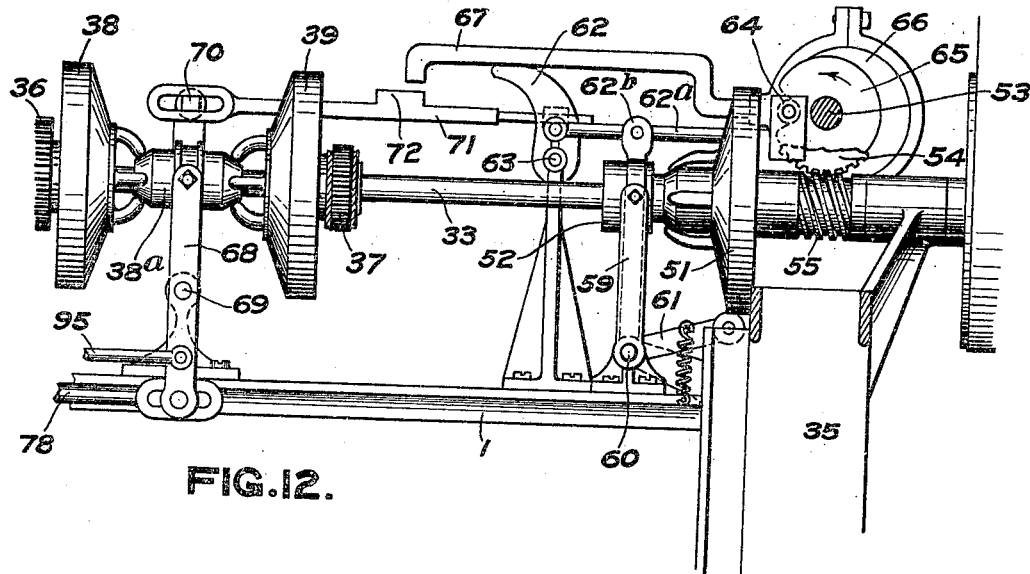
Figure 12:
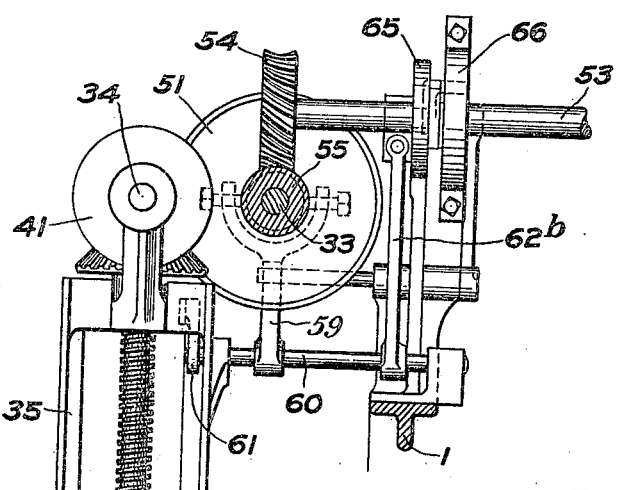
Figure 13:
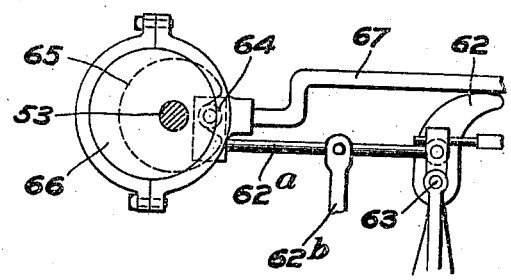

A friction clutch 51 is supported on the shaft 33, and has a sleeve 52 adapted to engage the clutch when moved to the left (see Fig. 11). Above the shaft 33, and at right angles to it, is supported a shaft 53, having a toothed wheel 54 at one end engaging a worm 55 on the sleeve of the clutch 51. At the opposite end of the shaft 53 is a crank disk 56 (see Fig. 1), so connected by a link 56ª that when the said shaft is revolved, the pivoted arm 57 is swung, and the link 58 connecting the end of the arm with the floor track 21 causes the track to move the row of carriers one unit. One carrier is moved its own length for every complete revolution of the shaft 53, and the shaft makes one complete revolution for every pile of trays taken into the machine.

The clutch 51 and worm 55 are locked to the shaft 34 by the following means:—A bell crank lever 59 pivoted on the shaft 60 (see Fig. 11) is connected at the upper end to the sleeve 52. The other arm 61 is adapted to be engaged by a roller 44 on one elevator, as the latter rises (see Fig. 3). This will immediately swing the bell crank lever and set the clutch 51.

A pawl 62, pivoted to a bracket at 63, is connected by a link 62ª to a roller 64, which normally rests in a notch in a disk 65 on the shaft 53. Adjacent to the disk is an eccentric 66 adapted to move a hook bar 67. The link 62ª is supported by a rock arm 62ᵇ loose on the shaft 60.

The operating lever 68 for the "up" clutch 39 and the "down" clutch 38 is pivoted between them at 69, and a block 70 at its upper end fits in a slot in a bar 71. This bar is supported in the same bracket which supports the pawl 62, and has a projection or lug 72 on its upper side. The shaft 53 turns in the direction of the arrow (see Fig. 11). As the disk 65 and eccentric 66 rotate with said shaft, the roller 64 rides out of the notch onto the face of the disk, thus pushing the pawl 62 down and allowing the end of the hook bar 67 to fall onto the lug 72, and preventing the clutch 51 from being disengaged. As the eccentric advances, the hook 67 is pushed over the said lug 72, and on the return movement draws the bar 71 back, thereby engaging the "up" clutch 39, which has been out of engagement. While the elevator is being fed downward to perform the operation just described, the hook bar 67 is being drawn back, engaging the "up" clutch 39.

The gear 80 (Fig. 8), which meshes with the gear 75, has an arm 80ª with which a rod 81 makes a connection to a pivoted arm 82 near the bottom of the elevator-frame. A lug 83 on the arm 82 is engaged by the casting 42 of the elevator as the latter reaches the end of its downward travel, and thereby the gears 75 and 80 are revolved together in the opposite direction to that indicated by arrows in Fig. 8, against the action of the spring 79, and the projection 74 falls into place as shown, and locks these parts. In this position the clutch operating lever 68 is in the center, neither clutch being engaged.

As the upward movement of the elevators must be intermittent, to allow one tray at a time to be pulled from the pile into the machine, the following mechanism is provided to effect this result: A bar 84, pivoted to the machine frame at 85 (see Fig. 10), has a lug 86 upon it in such a position that it will be struck by the trays as they rise. On the inner end of the bar is a projection 87, which is engaged by a pin 87ᵃ on an arm 88 fixed to the tumbler-shaft 89. The opposite or outside end of the bar 84 has a slot-and-pin connection with a block 90 fixed to a vertical rod 91. Said rod forms a connection to the clutch-operating lever 68 through a pivoted lever 92, (Fig. 8) rod 93, bell-crank 94, and link 95. As the tumbler revolves, the pin 87ᵃ causes the bar 84 to tilt, forcing the rod 91 down, and, through the connecting rods and levers, throwing the "up" clutch into engagement. The elevator then rises, lifting the pile of trays until the upper one strikes the lug 86, which reverses the operation, and the "up" clutch is unlocked, and the upward movement ceases, allowing another tray to be pulled into the tumbler.

The shaft 89 of the tumbler 17 has upon it, outside the frame 1, a gear 97, driven by the motion of the cam 12 (see Fig. 1), transmitted through the rod 98 and the rocking segment 96, and to the like parts on the other side of the machine through the shaft 97ᵃ. The shaft of the tumbler does not extend across, but is made in two short pieces, one on each side. The tumbler proper is made up of angle-pieces 99, joined by cross-bars 100, forming a frame adapted to receive a tray. A bar 101, curved to fit the path traveled by the ends of the angle pieces 99, prevents the tray from falling out of the tumbler as it turns over.

In the frame 1, near the top, is a cross shaft 102, driven from the main shaft 2 (Figs. 1 and 2). From this auxiliary or countershaft all of the mechanisms of the starch machine are driven, except those just described.

A horizontal screw-conveyer 103 (see Fig. 15) on a shaft 104, feeds the starch which has fallen from the trays along the bottom of the cleaner hopper 29 toward the front of the machine. Another horizontal right and left screw conveyer 30, driven from the shaft 104 by bevel gears 106, feeds the starch to the sides of the machine (see Fig. 4). Double screw-conveyers 31 (right and left), driven by bevel gears 108 from a horizontal shaft 109, elevate the starch to the hopper or box 18.

Near the open bottom of the box 18 are a number of wire screen rollers 110, pivoted close together (see Fig. 5). These are each oscillated through a small arc by an eccentric 111 on the shaft 102, and the starch is sifted through them in a steady shower, falling into a tray 112 waiting below. The starch will, of course, heap up in the tray, and as a level surface is necessary in which to impress the mold, a leveling bar 113, Fig. 5, supported in pivoted side frames 114, is arranged to scrape the surplus starch from the top of the tray. The side frames have beveled ends, so that they may ride up on the sides of the tray to bring the leveler 113 into position.

A pair of arms 115, connected by a rod 116 to the operating-cam 13, are pivoted at their lower ends to the frame 1, and are rocked by said cam (see Fig. 1). The arms 115 are connected to the mechanism for moving the trays through the machine. For the same purpose another pair of arms 115ᵃ on a shaft 115ᵇ, Fig. 16, are rocked by an extension 116ᵃ of the rod 116, and are connected to the track 20 by links 115ᶜ. Two pairs of parallel rods 117 and 118 (see Fig. 5) are suitably guided in stationary channel pieces 119, extending from the rear of the tumbler to the rear elevator. The trays slide along on top of the channel pieces, while guides 120 prevent any sidewise movement.

A number of dogs or pawls 19 are pivoted to the rod 117, by a slot and pin connection as shown at 121, and to the rod 118 at 122 (see Fig. 5), and are located at distances apart equal to about one and one half times the length of a tray, see Fig. 5. A block 123 is fixed to the rod 118, and a smaller block 124 is fixed to the rod 117, and is small enough to have considerable play in the notch of the block 123. Connecting the arm 115 with the block 124 is a link 125. When the arm 115 is swung forward through the action of the driving cam 13, the block 124 and the rod 117 will be moved in the same direction. Friction will hold the rod 118 stationary, and, as the dogs 19 are pivoted to said rod at 122, they will be swung around and their upper ends brought below the top of the channel pieces 119. At this moment the block 124 will strike the blocks 123, and the rod 118, being fixed to the latter, will move forward in unison with the rod 117, the dogs 19 passing underneath the trays. As the limit of motion of the cam 13 is reached, it reverses, and the arm 115, the rod 117, and block 124 are pulled back, thus raising the dogs 19 to the position shown in Fig. 5. The block 124 then strikes the block 123, and both rods move back together, each pair of dogs catching a tray and pushing it along the track. As the pull-in rods 117 and 118 are nearer together than the guide-bars 120, it is obvious that if they were continued to the front elevator, they would interfere with the operation of the tumbler 17. Therefore, the rods 117 and 118 extend only far enough to take the trays as they move inward from the tumbler.

Blocks 117$^a$ (see Figs. 4 and 5) are fixed to the rod 117, and through them is a bar 118$^a$ extending to the outside of the guides 120. On each end of said bar is a post 118$^b$ held upright. Rods 117$^b$, guided in suitable bearings, extend through the posts 118$^b$ at their rear ends, and at their front ends carry pivoted levers 120$^a$ (Fig. 1). Rods 117$^c$ connect the top of the posts 118$^b$ with the upper ends 120$^b$ of levers 120$^a$. Collars 118$^c$ and 118$^d$ are fixed to the rods 117$^a$, the posts 118$^b$ having a slight movement between them. When the rods 117 move forward (to the left in Fig. 5), the posts 118$^b$ move with them, and the rods 117$^b$ remain stationary. The rods 117$^c$, being fixed to the posts 118$^b$, also move, thus tilting the upper ends of levers 120$^a$ outward. When the posts 118$^b$ have advanced far enough to strike the collars 118$^c$, the rods 117$^b$ will move with them, the fingers or levers 120$^a$ remaining tilted, passing over the top of the uppermost tray in the front elevator. As soon as the rods 117 begin their backward travel, the rods 117$^c$ pull the levers 120$^a$ to the vertical position again. Then, as soon as the posts 118$^b$ strike the collars 118$^d$, the rods 117$^b$ will also move toward the rear. The lower ends of the levers 120$^a$ then strike the front side of the uppermost tray, and it is pulled off the pile on the elevator and into the tumbler.

To propel the carriers along the floor to the rear of the machine, a similar device to that just described is employed. The carriers (see Fig. 28) have four wheels 126 adapted to run on stationary rails 127. The platform 128 has on its under side a lug 129, set at one side of the center. In guides on the floor are two rods 130, to which are pivoted dogs 131, which operate in exactly the same manner as the dogs 19. The two links 58 of the arms 57 are connected by a cross-bar 127 to allow the carriers to travel, without hindrance, along the track. To this cross-bar is attached the block corresponding to the block 124.

In the next operation the mold is made in the full tray of starch into which the candy is to be cast. This is done in the press 23, the frame of which consists of two upright posts or bearings 133 (see Figs. 1 and 16). Rods 134 extend through these, and are connected at their lower ends with the cams 14 and 15. The frame 24, carrying the molding stamp, fits on shoulders on the rods 134, and a spring 135 is placed between it and a collar 136 to cushion the pressure of the stamp. Thumb screws 137 hold the mold-plate in the frame 24. The cams 14 and 15 are so formed as to give the mold a slight lift and another depression after it has come down once, to insure a perfect impression. This is accomplished by the curve near the end of the slot in cams 14 and 15, Figs. 29 to 31.

Shafts 138 and 138$^a$ (see Fig. 18) extend across the machine, and are driven through a chain of gears 139 by the main shaft 2. A gear 140, pivoted on a movable link 141, is arranged in the train so that it may be swung to mesh with the pinion on the shaft 2 and the gear 139$^a$, as required. Gears of different sizes are provided, to be substituted for the gear 140, in order to rotate the shafts 138 and 138$^a$ at an unvarying ratio of speed to the movement of the trays under the dropper, as will be explained. The shaft 138$^a$ may also be thrown into or out of operation when desired by means of a clutch 142, controlled by a hand-lever 143 (see Fig. 17).

To provide for the correct placing of the tray of molded starch under the dropper 25, so that the rows of impressions in which the candy is to be cast may be filled without waste, the following described mechanism is provided:—An eccentric 144 on the shaft 138 (see Fig. 16) is connected to a rocker-arm 145 by a rod 146. On a shaft 147 is a spur-gear 148 meshing with a smaller gear 149 on a shaft 150. Between the side frames 3 of the machine, on the shaft 150, is a sprocket wheel 151, and in line with said sprocket is another 152. A chain 153 forms a positive driving connection between the two sprockets. A series of lugs 154 are attached to the chain 153 at equal intervals, and are each adapted to engage the rear end of a loaded tray as it leaves the press. On the shaft 147 is a ratchet wheel 155, a plan view of which is shown in Fig. 16$^a$. The outside half of this wheel has ratchet teeth around its whole circumference, while the inner half has but two teeth 156, diametrically opposite each other. A slotted link 157, pivoted on the shaft 147, has an extension 158 carrying one or more pawls 159. This slotted link is connected to the rocker-arm 145 by a rod 160. A thumb screw 161 permits the end of the rod 160 to be set at different positions in the link-slot, and thereby to vary the stroke of the extension 158. On the shaft 147 is an arm 162, having a pawl 163 at its upper end, adapted to engage the single tooth 156 of the ratchet wheel 155. The lower end of this arm 162 is connected to the rocker arm 145 by a rod 164. The arm 162 swings a given distance at all times, as its connection with the rod 164 is not adjustable.

To vary the number of successive steps which the tray will take in passing under the dropper, the thumb screw 161 is moved to the desired position on the link 157, and the required gear is placed on the shaft 138$^a$. Placing the thumb screw near the top of the link will cause the tray to cover the distance in a fewer number of steps, thus allowing fewer rows of drops to be cast in the molded starch, the stamp having also been changed to make the desired impression to receive this specific number of rows. Placing the thumb screw at the bottom of the link will have the opposite effect. The teeth 156 on the ratchet wheel 155 are placed at such a point that the pawl 163 has no effect, except just as the tray begins to come under, and just as it leaves, the dropper; the pull-in rods place the trays in correct position to be taken up by the lugs 154, and also take them from the dropper to the rear elevator.

It will be seen that the motion of the eccentric 144 will cause the arm 162 to swing through a greater arc than the link 157. The pawl 163, by engaging one of the teeth 156, moves the ratchet wheel 155 around and brings the first row of molds under the dropper. As the rest of the inner half of the ratchet wheel is blank, the pawl 163 has no further effect, and through the next half revolution the tray is moved under the dropper in a succession of steps corresponding to the number of rows of impressions in the starch. When the last row is under the dropper, the other tooth 156 has come to a position where the pawl 163, as the eccentric makes the next stroke, may strike it, and thereby move the tray to a position where it may be caught by the dogs 19 and carried into the rear elevator 26.

The hopper 165 of the dropping mechanism 25 is attached to a casting 166 (see Figs. 19 and 20) supported by brackets 167 on the machine frame. A cylindrical sleeve 168 is fitted so that it may be rotated in said casting. This sleeve may be removed and another substituted as required through the end of the casting 166. A hand-nut 169 prevents endwise movement of the sleeve when in operation. A number of gates 170 are fixed in the sleeve 168 at equal distances apart, and between them are pistons 171, fitting the interior of said sleeve closely, and fastened on a rod 172 adapted to be reciprocated by means hereinafter described. Collars 173 are the specific means used in this instance to hold the disks 171 in position.

The gates 170 have two oppositely beveled notches 174 and 175, on opposite sides, 90 degrees apart, and two smaller oppositely beveled notches 176 and 177 (see Figs. 21 to 23). The sleeve 168 has inlet and discharge openings to correspond with these notches (see Fig. 19).

The mechanisms for rotating the sleeve 168 and reciprocating the rod 172 are so timed that as the pistons 171 are being moved to the left in Fig. 20, the sleeve is held stationary in the position there shown. The suction caused by the pistons will draw a quantity of syrup from the hopper 165 through the notches 175 into the sleeve. The sleeve is then turned 90 degrees in a clockwise direction. This shuts off the notches 175, and brings the notches 174 to the top, where syrup may run through them into the sleeve, to the right side of the gates 170. At the same time the small notches 177 are brought to the bottom, and as the rod 172 is pushed inward, the pistons, force the syrup through the notches 177, whence it falls into the mold waiting below. As the pistons 171 move to the right, syrup is drawn from the hopper by the suction, through the notches 174 which now register with the inlet openings in the sleeve 168. When the pistons 171 reach the extreme end of their travel, the mechanism for rocking the sleeve brings it back to its former position, shutting off the openings 174, and placing the notches 176 at the bottom and in registry with the outlet openings. The syrup drawn in through the notches 174 is forced out through the notches 176, and the dropping mechanisms are then at their original positions. In this last described cycle of operations two rows of candies are cast, there being as many in a row as there are gates and pistons in the sleeve. To insure the syrup falling freely from the dropper, and not spreading out on its under side, a removable plate 178, having a raised nipple 179 for each outlet of the sleeve 168, is held in guide ways in the casting 166.

Parallel to the center line of the machine is a shaft 180, driven from the shaft 138ª by bevel gears 181 (see Fig. 16). The shaft 138ª extends through a block 182, formed with guides 183, in which is adapted to slide a cross head 184. A cam 185, of the form shown in Fig. 26, is fixed upon the shaft 138ª, and is adapted, as it revolves, to strike rollers 186 pivoted on said cross head, thus moving the latter forward and backward.

A pinion 187 is connected by a tongue joint (see Fig. 20) to the sleeve 168. In mesh with this pinion are two segmental gears 188, pivoted at 189 on the brackets 167. Bars 191 link said gears together, and a rod 192 forms a connection to the cross head 184, whereby, as the cross head moves, the segmental gears 188 will be rocked, thus turning the sleeve 168 through 90 degrees of arc. The cam 185 is so formed as to move the cross head 184 one way, and then to allow it to remain stationary for a time, then to move it in the other direction, and to allow it to remain stationary for another period, each time the shaft 138ª makes one revolution. The shaft 180 extends through a block 193, in which a cross head 194 is adapted to slide. The plunger rod 172 is connected to this cross head at 195. A cam 196 on the shaft 180 strikes rollers 197 hung in arms 198. The arms are pivoted to the cross head 194 at 199, and a right and left screw 200 tapped through blocks at their upper ends will, when turned, move the rollers 197 closer together or farther apart. As the rollers 197 are drawn closer together, the cam 196 can drive the cross head 194 the full length of its stroke. As the rollers are placed farther apart, the cam 196 can only drive the cross head out or in a short distance when near the end of each half revolution. Thus the action of the plungers or disks 171 may be controlled to a fine degree.

A shaft 201, extending across the starch machine, is driven from the shaft 102 by a belt 202 (see Figs. 1 and 2). In the center of the shaft 201 is a crank or equivalent device 203. In brackets 204 fastened to the frame 1 (Fig. 15), are curved slots 205, and the ends of two shafts 206 and 207 are supported therein. These two shafts, also shafts 208 and 209, are held equidistant from each other by side frames 210, in which they are free to revolve.

Cylindrical brushes 211 are carried by the shafts 206, 207, 208, 209, and are arranged to be driven in the direction shown in Fig. 15, by means of a belt 212 from the countershaft 102 (see Fig. 1) and a belt 213 wound around a pulley on each shaft.

Below the brushes 211 are a series of screen rollers 214 pivoted in stationary frames 215. Between each two rollers is a plate 216 to prevent candies from dropping down between them. These rollers are driven from worm gears 217 on a shaft 218. A belt 219 (Fig. 1) from the shaft 102 crosses over an idler 220 and drives the candy conveyer-belt 32. On the shaft 221 of a pulley of the conveyer-belt is an internally-toothed gear 222, (see Fig. 15) in which meshes a pinion 223 on the shaft 218. The starch and candy falls from the trays as the latter are inverted by the tumbler, and the candy slides down a screen 224 onto the first roller 214, most of the starch falling through into the hopper 29 below. As soon as the rollers 214 feed the candy along far enough, the brushes 211 begin to brush the remaining starch from it, and help the screen rollers push it along onto the conveyer-belt 32.

By reason of the brush-shafts traveling in the curved slots 205, the brushes are caused to have an up and down motion, while they are being reciprocated backward and forward by the crank 203, which is attached to the frame 210 by a rod 224. This is to brush the candies out of the hollows between the rollers. To keep the brushes revolving steadily during the up and down and reciprocating motion, the belt 212 is held in tension by a spring tightener 225 or similar device.

A hood 226 is placed over the brushes to keep the starch out of them, and a guard 227 is placed around the belt 213 and its pulleys for the same purpose (see Fig. 15). Slots are cut in the sides of the hopper 29, through which the shafts of the brushes pass, plates 228 fitting said shafts and traveling with them. These plates 228 are made wide enough to cover the slots at all points, so that no starch may fall outside the hopper.

The candies fall from the last screen roller onto the conveyer-belt 32, which carries them out to another belt 229 at the side of the machine (see Fig. 2). A perforated pipe 230 delivers a blast of air upon this belt, which removes the last traces of starch from the candies. A suitable receptacle receives them at the end of the belt 229.

The rear elevator 26 is arranged to work in unison with the front elevator 16, moving upward as the latter moves downward, and vice versa.

Two shafts 231 (Figs. 16 and 18) are carried in bearings on the main frame, one on each side of the machine. On the ends of these shafts are spiral gears 232, meshing with others 233 on the screw spindles $40^a$. Similar spiral gears 234 on the front ends of the rods 231 mesh with gears 235 on the spindles 40 of the front elevator. The spiral gears are all of equal size, and the screw threads on all the spindles are alike. Therefore it is obvious that the rear elevator will descend and deposit a pile of trays (which have been fed into it one by one from the reciprocating track 20) onto a carrier waiting on the floor below, while the front elevator is taking a pile of trays from another carrier, and is raising them into position to be pulled into the machine, as heretofore described.

What I claim is:—

1. In a candy molding machine, means for discharging the contents of molding trays, means for separating the candies from the contents of said trays, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

2. In a candy molding machine, means for discharging the contents of molding trays, means for separating the candies from the contents of said trays, means for carrying the candies to a predetermined point, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

3. In a candy molding machine, means for discharging the contents of molding trays, means for separating the candies from the contents of said trays, means for cleaning the candies and means for carrying the candies to a predetermined point, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking the trays from said carrier and delivering them to said propelling means.

4. In a candy molding machine, means for discharging the contents of molding trays, means for separating the candies from the contents of said trays, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

5. In a candy molding machine, means for discharging the contents of molding trays, means for separating the candies from the contents of said trays, means for carrying the candies to a predetermined point, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

6. In a candy molding machine, means for discharging the contents of molding trays, means for separating the candies from the contents of said trays, means for cleaning the candies and means for carrying the candies to a predetermined point, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

7. In a candy molding machine, means for reversing molding trays, means for separating the candies from the contents of said trays, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

8. In a candy molding machine, means for reversing molding trays, means for separating the candies from the contents of said trays, means for carrying the candies to a predetermined point, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

9. In a candy molding machine, means for reversing molding trays, means for separating the candies from the contents of said trays, means for cleaning the candies and means for carrying the candies to a predetermined point, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

10. In a candy molding machine, means for reversing molding trays, means for separating the candies from the contents of said trays, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

11. In a candy molding machine, means for reversing molding trays, means for separating the candies from the contents of said trays, means for carrying the candies to a predetermined point, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

12. In a candy molding machine, means for reversing molding trays, means for separating the candies from the contents of said trays, means for cleaning the candies and means for carrying the candies to a predetermined point, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

13. In a candy molding machine, a tumbler device, means for holding a molding tray in said tumbler device and means for turning said tumbler, means for separating the candies from the contents of said trays, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

14. In a candy molding machine, a tumbler device, means for holding a molding tray in said tumbler device and means for turning said tumbler, means for separating the candies from the contents of said trays, means for carrying the candies to a predetermined point, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

15. In a candy molding machine, a tumbler device, means for holding a molding tray in said tumbler device and means for turning said tumbler, means for separating the candies from the contents of said trays, means for cleaning the candies and means for carrying the candies to a predetermined point, means for refilling the trays with molding material, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

16. In a candy molding machine, a tumbler device, means for holding a molding tray in said tumbler device and means for turning said tumbler, means for separating the candies from the contents of said trays, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

17. In a candy molding machine, a tumbler device, means for holding a molding tray in said tumbler device and means for turning said tumbler, means for separating the candies from the contents of said trays, means for carrying the candies to a predetermined point, means for refilling the trays with molding material, means for carrying the discharged molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

18. In a candy molding machine, a tumbler device, means for holding a molding tray in said tumbler device and means for turning said tumbler, means for separating the candies from the contents of said trays, means for cleaning the candies and means for carrying the candies to a predetermined point, means for refilling the trays with molding material, means for carrying the discharging molding material to said refilling means, means for impressing patterns in said molding material, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

19. In a candy molding machine, means for discharging the contents of molding trays, means for separating the candies from the contents of said trays, means for refilling the trays with molding material, means for impressing rows of patterns in said molding material, means for delivering measured quantities of unset candy into said rows of impressions, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

20. In a candy molding machine, means for discharging the contents of molding trays, means for separating the candies from the contents of said trays, means for carrying the candies to a predetermined point, means for refilling the trays with molding material, means for impressing rows of patterns in said molding material, means for delivering measured quantities of unset candy into said rows of impressions, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

21. In a candy molding machine, means for discharging the contents of molding trays, means for separating the candies from the contents of said trays, means for cleaning the candies and means for carrying the candies to a predetermined point, means for refilling the trays with molding material, means for impressing rows of patterns in said molding material, means for delivering measured quantities of unset candy into said rows of impressions, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

22. In a candy molding machine, means for discharging the contents of molding trays, means for separating the candies from the contents of said trays, means for refilling the trays with molding material, means for carrying the discharged molding material to said refilling means, means for impressing rows of patterns in said molding material, means for delivering measured quantities of unset candy into said rows of impressions, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

23. In a candy molding machine, means for discharging the contents of molding trays, means for separating the candies from the contents of said trays, means for carrying the candies to a predetermined point, means for refilling the trays with molding material, means for carrying the discharged molding material to said refilling means, means for impressing rows of patterns in said molding material, means for delivering measured quantities of unset candy into said rows of impressions, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

24. In a candy molding machine, means for discharging the contents of molding trays, means for separating the candies from the contents of said trays, means for cleaning the candies and means for carrying the candies to a predetermined point, means for refilling the trays with molding material, means for carrying the discharged molding material to said refilling means, means for impressing rows of patterns in said molding material, means for delivering measured quantities of unset candy into said rows of impressions, and means for filling the impressions in said molding material with candy, propelling means for moving the molding trays forward from the receiving end to the delivery end of the machine, one or more tray carriers, means for delivering trays from the propelling means to a carrier at the delivery end of the machine, means for moving the carrier backward to the receiving end of the machine, and means for taking trays from said carrier and delivering them to said propelling means.

25. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for refilling the trays with molding material, means for impressing patterns in said molding material, means for filing the impressions in said molding material with candy, means for delivering trays to a carrier, and means for returning the carriers from the position where trays are delivered thereto to the position where trays are taken therefrom.

26. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for carrying the candies to a predetermined point, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

27. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for cleaning the candies and means for carrying the candies to a predetermined point, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

28. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

29. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for carrying the candies to a predetermined point, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

30. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for cleaning the candies and means for carrying the candies to a predetermined point, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

31. In a candy molding machine, a tray carrier adapted to support molding trays, means for taking the trays from said carrier, propelling means for moving said trays along a predetermined path from one end of the machine to the other, means for reversing said trays, means for separating the candies from the contents of said trays, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

32. In a candy molding machine, a tray carrier adapted to support molding trays, means for taking the trays from said carrier, propelling means for moving said trays along a predetermined path from one end of the machine to the other, means for reversing said trays, means for separating the candies from the contents of said trays, means for carrying the candies to a predetermined point, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

33. In a candy molding machine, a tray carrier adapted to support molding trays, means for taking the trays from said carrier, propelling means for moving said trays along a predetermined path from one end of the machine to the other, means for reversing said trays, means for separating the candies from the contents of said trays, means for cleaning the candies and means for carrying the candies to a predetermined point, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

34. In a candy molding machine, a tray carrier adapted to support molding trays, means for taking the trays from said carrier, propelling means for moving said trays along a predetermined path from one end of the machine to the other, means for reversing said trays, means for separating the candies from the contents of said trays, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

35. In a candy molding machine, a tray carrier adapted to support molding trays, means for taking the trays from said carrier, propelling means for moving said trays along a predetermined path from one end of the machine to the other, means for reversing said trays, means for separating the candies from the contents of said trays, means for carrying the candies to a predetermined point, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

36. In a candy molding machine, a tray carrier adapted to support molding trays, means for taking the trays from said carrier, propelling means for moving said trays along a predetermined path from one end of the machine to the other, means for reversing said trays, means for separating the candies from the contents of said trays, means for cleaning the candies and means for carrying the candies to a predetermined point, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

37. In a candy molding machine, a tray carrier adapted to support molding trays, means for taking the trays from said carrier, propelling means for moving said trays along a predetermined path from one end of the machine to the other, a tumbler device, means for holding a tray in said tumbler device and means for turning said tumbler, means for separating the candies from the contents of said trays, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

38. In a candy molding machine, a tray carrier adapted to support molding trays, means for taking the trays from said carrier, propelling means for moving said trays along a predetermined path from one end of the machine to the other, a tumbler device, means for holding a tray in said tumbler device and means for turning said tumbler, means for separating the candies from the contents of said trays, means for carrying the candies to a predetermined point, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

39. In a candy molding machine, a tray carrier adapted to support molding trays, means for taking the trays from said carrier, propelling means for moving said trays along a predetermined path from one end of the machine to the other, a tumbler device, means for holding a tray in said tumbler device and means for turning said tumbler, means for separating the candies from the contents of said trays, means for cleaning the candies and means for carrying the candies to a predetermined point, means for refilling the trays with molding material, means for impressing patterns in said molding material, means for filling the impressions in said molding material with candy, means for delivering trays to a carrier, and means for returning the carriers from the position where trays are delivered thereto to the position where trays are taken therefrom.

40. In a candy molding machine, a tray carrier adapted to support molding trays, means for taking the trays from said carrier, propelling means for moving said trays along a predetermined path from one end of the machine to the other, a tumbler device, means for holding a tray in said tumbler device and means for turning said tumbler, means for separating the candies from the contents of said trays, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

41. In a candy molding machine, a tray carrier adapted to support molding trays, means for taking the trays from said carrier, propelling means for moving said trays along a predetermined path from one end of the machine to the other, a tumbler device, means for holding a tray in said tumbler device and means for turning said tumbler, means for separating the candies from the contents of said trays, means for carrying the candies to a predetermined point, means for refilling the trays with molding material, means for carrying the discharged molding material to said refilling means, means for impressing patterns in said molding material, means for filling the impressions in said molding material with candy, means for delivering trays to a carrier, and means for returning the carriers from the position where trays are delivered thereto to the position where trays are taken therefrom.

42. In a candy molding machine, a tray carrier adapted to support molding trays, means for taking the trays from said carrier, propelling means for moving said trays along a predetermined path from one end of the machine to the other, a tumbler device, means for holding a tray in said tumbler device and means for turning said tumbler, means for separating the candies from the contents of said trays, means for cleaning the candies and means for carrying the candies to a predetermined point, means for refilling the trays with molding material, means for carrying the discharged molding material to said refilling means, means for impressing patterns in said molding material, means for filling the impressions in said molding material with candy, means for delivering trays to a carrier and means for returning the carriers from the position where trays are delivered thereto to the position where trays are taken therefrom.

43. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for refilling the trays with molding material, means for impressing rows of patterns in said molding material, means for delivering measured quantities of unset candy into said rows of impressions, means for filling the impressions in said molding material with candy, means for delivering trays to a carrier, and means for returning the carriers from the position where trays are delivered thereto to the position where trays are taken therefrom.

44. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for carrying the candies to a predetermined point, means for refilling the trays with molding material, means for impressing rows of patterns in said molding material, means for delivering measured quantities of unset candy into said rows of impressions, means for filling the impressions in said molding material with candy, means for delivering trays to a carrier, and means for returning the carriers from the position where trays are delivered thereto to the position where trays are taken therefrom.

45. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for cleaning the candies and means for carrying the candies to a predetermined point, means for refilling the trays with molding material, means for impressing rows of patterns in said molding material, means for delivering measured quantities of unset candy into said rows of impressions, means for filling the impressions in said molding material with candy, means for delivering trays to a carrier, and means for returning the carriers from the position where trays are delivered thereto to the position where trays are taken therefrom.

46. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for refilling the trays with molding material, means for carrying the discharged molding material to said refilling means, means for impressing rows of patterns in said molding material, means for delivering measured quantities of unset candy into said rows of impressions, means for filling the impressions in said molding material with candy, means for delivering trays to a carrier, and means for returning the carriers from the position where trays are delivered thereto to the position where trays are taken therefrom.

47. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for carrying the candies to a predetermined point, means for refilling the trays wtih molding material, means for carrying the discharged molding material to said refilling means, means for impressing rows of patterns in said molding material, means for delivering measured quantities of unset candy into said rows of impressions, means for filling the impressions in said molding material with candy, means for delivering trays to a carrier, and means for returning the carriers from the position where trays are delivered thereto to the position where trays are taken therefrom.

48. In a candy molding machine, a tray carrier adapted to support molding trays, means for taking the trays from said carrier, propelling means for moving said trays along a predetermined path from one end of the machine to the other, means for discharging the contents of said trays, means for separating the candies from the contents of said trays, means for cleaning the candies and means for carrying the candies to a predetermined point, means for refilling the trays with molding material, means for carrying the discharged molding material to said refilling means, means for impressing rows of patterns in said molding material, means for delivering measured quantities of unset candy into said rows of impressions, means for filling the impressions in said molding material with candy, means for delivering trays to a carrier, and means for returning the carriers from the position where trays are delivered thereto to the position where trays are taken therefrom.

49. In a candy molding machine, an elevator mechanism for elevating a pile of trays, transferring mechanism for removing the top tray from the pile, propelling means for moving the tray from said transferring mechanism through the machine, means for producing molded candies in said tray, and a lowering mechanism for receiving trays from said propelling means and for delivering them.

50. In a candy molding machine, an elevator mechanism for elevating a pile of trays, transferring mechanism for removing the top tray from the pile, propelling means for moving the tray from said transferring mechanism through the machine, means for producing molded candies in said tray, a lowering mechanism for receiving trays from said propelling means, and a tray carrier for receiving trays from the last mentioned lowering mechanism.

51. In a candy molding machine, an elevator mechanism for elevating a pile of trays, transferring mechanism for removing the top tray from the pile, propelling means for moving the tray from said transferring mechanism through the machine, means for producing molded candies in said tray, a lowering mechanism for receiving trays from said propelling means, a tray carrier for receiving trays from the last mentioned lowering mechanism, and means for returning the carrier from the lowering mechanism to the elevator mechanism.

52. In a candy molding machine, an elevator mechanism for elevating a pile of trays, transferring mechanism for removing the top tray from the pile, propelling means for moving the tray from said transferring mechanism through the machine, means for producing molded candies in said tray, and a lowering mechanism for receiving trays from said propelling means and for piling them.

53. In a candy molding machine, an elevator mechanism for elevating a pile of trays, transferring mechanism for removing the top tray from the pile, propelling means for moving the tray from said transferring mechanism through the machine, means for producing molded candies in said tray, a lowering mechanism for receiving trays from said propelling means and for piling them, and a tray carrier for receiving the pile of trays from the lowering mechanism.

54. In a candy molding machine, an elevator mechanism for elevating a pile of trays, transferring mechanism for removing the top tray from the pile, propelling means for moving the tray from said transferring mechanism through the machine, means for producing molded candies in said tray, a lowering mechanism for receiving trays from said propelling means and for piling them, a tray carrier for receiving the pile of trays from the last mentioned lowering mechanism, and means for moving the carrier from the lowering mechanism to the elevator mechanism.

55. In a candy molding machine, means for producing molded candies, an elevator mechanism for elevating each of a pile of trays to a particular position, transferring mechanism for removing the top tray from the pile, and propelling means for receiving and moving the transferred tray through said means for producing molded candies.

56. In a candy molding machine, means for producing molded candies, an elevator mechanism for elevating each of a pile of trays to a particular position, transferring mechanism for removing the top tray from the pile, propelling means for receiving and moving the transferred tray through said means for producing molded candies, and a lowering mechanism for receiving trays from said propelling mechanism and for delivering them.

57. In a candy molding machine, means for producing molded candies, an elevator mechanism for elevating each of a pile of trays to a particular position, transferring mechanism for removing the top tray from the pile, propelling means for receiving and moving the transferred tray through said means for producing molded candies, and a lowering mechanism for receiving trays from said propelling mechanism and for piling them.

58. In a candy molding machine, means for producing molded candies, an elevator mechanism for elevating each of a pile of trays to a particular position, transferring mechanism for removing the top tray from the pile, propelling means for receiving and moving the transferred tray through said means for producing molded candies, a lowering mechanism for receiving trays from said propelling mechanism and for delivering them, and a tray carrier for receiving the trays from the lowering mechanism.

59. In a candy molding machine, means for producing molded candies, an elevator mechanism for elevating each of a pile of trays to a particular position, transferring mechanism for removing the top tray from the pile, propelling means for receiving and moving the transferred tray through said means for producing molded candies, a lowering mechanism for receiving trays from said propelling mechanism and for delivering them, a tray carrier for receiving the trays from the lowering mechanism, and means for moving the carrier from the lowering mechanism to the elevator.

60. In a candy molding machine, an elevating apparatus comprising one or more tray-supporting plates, means for automatically setting and retaining the tray-supporting plate or plates in a supporting position at the lowest point in their path, means for causing the plate or plates to take a non-supporting position when moving toward the bottom of their path, means for automatically stopping the upward movement of the plates when the top tray thereon reaches a predetermined position, means for producing molded candies, transferring and conveying means for taking a tray from said tray-supporting plate or plates to said means for producing molded candies, and automatic means for producing, stopping and reversing the upward movement of said plate or plates.

61. In a candy molding machine, a pair of lifting devices, one or more tray-supporting plates carried by each lifting device, means for automatically setting and retaining the plate or plates in a supporting position when at the bottom of their path, means for automatically causing the plate or plates to take a nonsupporting position when they reach the top of their path, means for automatically stopping the upward movement of the plate or plates when trays thereon reach a predetermined position, means for producing molded candies, means for producing, stopping and reversing the upward movement of the plate or plates, and transferring and conveying means for removing a tray from said plate or plates and for conveying it to predetermined positions in the means for producing molded candies.

62. In a candy molding machine, a pair of vertical screws, a tray-supporting plate carried by each screw, means for automatically setting and retaining the plates in a supporting position when at the bottom of their path, means for automatically causing the plates to take a nonsupporting position when they reach the top of their path, automatic means for rotating and reversing the rotation of the screws, means for automatically stopping the rotation of the screws when trays upon said plates reach a predetermined position, means for producing molded candies and means operating while a tray is at rest in said predetermined position to transfer and convey a tray from said plates to desired positions in the means for producing molded candies.

63. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, and a series of rotating brushes situated over the rollers for cleaning the candies and for propelling them toward the delivery point.

64. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, and a series of rotating and reciprocating brushes situated over the rollers for cleaning the candies and for propelling them toward the delivery point.

65. In a candy molding machine, means for moving molding trays, means for discharging the molding material and candies from said trays, screening means adapted to receive the discharged contents of the trays and to sift the same and to propel the retained candies toward a delivery point, a series of rotating and reciprocating brushes situated over the screening means for cleaning the candies and for propelling them toward a delivery point, means for returning the sifted molding material to a hopper above the path of said trays, and sifting screens for further sifting the material into a tray in said path.

66. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, a series of rotating brushes situated over the rollers for cleaning the candies and for propelling them toward the delivery point, means for returning the sifted molding material to a hopper above the path of said trays, and sifting screens for further sifting the material into a tray in said path.

67. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, a series of rotating and reciprocating brushes situated over the rollers for cleaning the candies and for propelling them toward the delivery point, means for returning the sifted molding material to a hopper above the path of said trays, and sifting screens for further sifting the material into a tray in said path.

68. In a candy molding machine, means for moving molding trays, means for discharging the molding material and candies from said trays, screening means adapted to receive the discharged contents of the trays and to sift the same and to propel the retained candies toward a delivery point, a series of rotating and reciprocating brushes situated over the screening means for cleaning the candies and for propelling them toward a delivery point, means for returning the sifted molding material to a hopper above the path of said trays, and sifting rollers for further sifting the material into a tray in said path.

69. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, a series of rotating brushes situated over the rollers for cleaning the candies and for propelling them toward the delivery point, means for returning the sifted molding material to a hopper above the path of said trays, and sifting rollers for further sifting the material into a tray in said path.

70. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, a series of rotating and reciprocating brushes situated over the rollers for cleaning the candies and for propelling them toward the delivery point, means for returning the sifted molding material to a hopper above the path of said trays, and sifting rollers for further sifting the material into a tray in said path.

71. In a candy molding machine, means for moving molding trays, means for discharging the molding material and candies from said trays, screening means adapted to receive the discharged contents of the trays and to sift the same and to propel the retained candies toward a delivery point, a series of rotating and reciprocating brushes situated over the screening means for cleaning the candies and for propelling them toward a delivery point, means for returning the sifted molding material to a hopper above the path of said trays, and oscillating sifting rollers for further sifting the material into a tray in said path.

72. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, a series of rotating brushes situated over the rollers for cleaning the candies and for propelling them toward the delivery point, means for returning the sifted molding material to a hopper above the path of said trays, and oscillating sifting rollers for further sifting the material into a tray in said path.

73. In a candy molding machine, means for moving molding trays along a predetermined path, means for discharging the molding material and candies from said trays, a series of sifting rollers adapted to receive the discharged contents of the trays and to sift the same and by their rotation to propel the retained candies toward a delivery point, a series of rotating and reciprocating brushes situated over the rollers for cleaning the candies and for propelling them toward the delivery point, means for returning the sifted molding material to a hopper above the path of said trays, and oscillating sifting rollers for further sifting the material into a tray in said path.

74. In a candy molding machine means for producing molded candies, rails for guiding a succession of trays in a path through said means, a pair of rods adjacent to said rails, a series of dogs each pivoted to both rods, and means for reciprocating both rods and for producing relative movement of the two rods for tilting the dogs into engagement with the trays in one direction of reciprocation and for tilting said dogs out of engagement with the trays in the other direction of reciprocation.

75. In a candy molding machine means for producing molded candies, rails for guiding the path of a succession of trays through said means, a pair of rods adjacent to said rails, stops on the rods for limiting relative longitudinal movement thereof, a series of dogs each pivoted to both rods, and means for reciprocating both rods and producing said relative movement for tilting the dogs into engagement with the trays in one direction of reciprocation and for tilting said dogs out of engagement with the trays in the other direction of reciprocation.

JOHN WERNER.

Witnesses:
D. GURNEE,
L. THON.